Aug. 26, 1941.  J. TREXLER  2,253,739
PISTON AND RING
Filed May 1, 1939
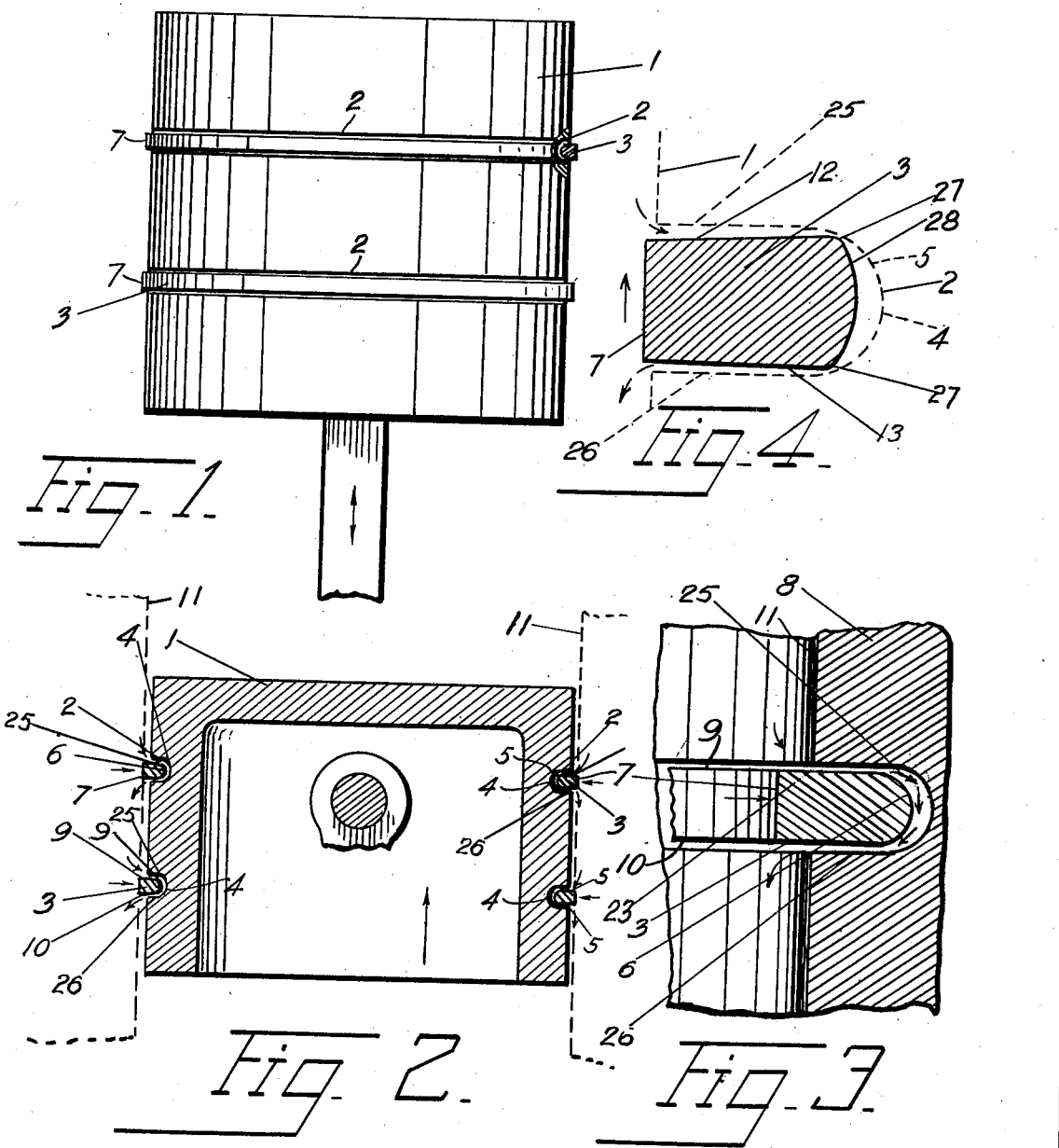
Inventor
JAY TREXLER.
By Howard J. Whelan.
Attorney Patented Aug. 26, 1941

2,253,739

UNITED STATES PATENT OFFICE 2,253,739

PISTON AND RING

Jay Trexler, Baltimore, Md.

Application May 1, 1939, Serial No. 271,114

2 Claims. (Cl. 309—7)

This invention refers to pistons and more particularly to rings for same. It has among its objects to provide a piston ring that will be effectively lubricated and operate easily within the grooves of the piston. Another object is to prevent the carbonizing of lubricant behind the piston rings and in the corners of the grooves which ordinarily induces "freezing" of the piston rings. A further object is to positively provide for the proper circulation of lubricant around the backs of the rings to keep the same from overheating and to permit the natural expanding, contraction, rotation and moving of the same.

Other objects will become apparent as the invention is more fully set forth.

The conventional form of piston ring has a rectangular cross-section and fits in a groove in the piston of similar section. This form, by reason of the square cross-section, has the disadvantage of causing the accumulation and hardening of oil and foreign sediment in the corners and thus prevents proper lubrication and rotation of the ring itself, eventually causing the ring to "freeze" in the groove. In this invention, the inner face of the ring is rounded and the surface of its receiving groove is also rounded in circular form. This arrangement keeps the ring effectively placed permits concentric movement, and allows the oil to circulate freely about it. It prevents the accumulation of lubricant and/or other foreign material in any portion of the groove and its subsequent carbonizing. The ring is kept relatively cool; will expand and contract freely, will move in the groove and adapt itself to the cylinder conditions without breaking down the oil film on the surface of the cylinder or drying the oil surface more than should be done to provide for adequate lubrication. This saves on the wear of the parts and enables the piston to work easier. By reason of the lack of sharp corners on the internal periphery of the ring, there is more flexibility in the same and less chance for breakage.

In the drawing, which illustrates an embodiment of this invention:

Figure 1 is a side elevation of a piston with rings embodying this invention in it, parts being broken away to indicate the construction, Figure 2 is a section view through the piston to indicate the general construction of the piston ring and the groove in the piston that it works in, Figure 3 is an enlarged detail of the packing ring section in a section of a cylinder groove, to indicate the action of the lubricant therein, Figure 4 is a modification of the ring section.

Similar reference characters refer to similar parts throughout the drawing.

In the construction in the drawing 1 represents a conventional piston body, with ring grooves 2 for the piston rings 3 to operate in. The grooves are recessed to provide ample space for the piston rings, and have their rear portions 4 provided wtih circular curves to round them off, preferably with a radius equivalent to about one-half the thickness of the ring. The horizontal surface 5 of the rings are flat and parallel to the horizontal surfaces 25, 26 of the grooves. This, under normal conditions, provides for the proper operation of the ring in the groove. The ring itself, is circularly rounded on its internal peripheral surface 6 on a radius equivalent to about one-half its thickness. This side surface 6, faces and aligns with the back face 5 of the groove. The external face 7 of the ring facing the cylinder wall 8 of the engine in which the piston is used, is straight and travels along the surface 11 of the cylinder in the conventional manner during the strokes. This type of ring is particularly valuable for Diesel type engines, where the pressure and temperature is very high comparatively. The gases in such engines are of the dirty type, and the scavenging action arising from the use of this invention, with oil passing under pressure through the grooves, affords protection against the rings jamming in the grooves and breaking.

In the operation and travel of the rings, the rings have expanding, contracting, rotative, and reciprocating movements in the grooves. The oil lubricant flows in by the upper face 9 of the rings into the grooves and out by the lower face 10, when the stroke is upwardly. Oil flows behind the piston ring, but by reason of the relatively long path, goes through slowly. Thus it does not leak past the piston ring to the same extent as it would if the ring was loose. The distance transversely across the piston ring is normally about one quarter inch, but the distance peripherally around the ring is three times as long. If it took the oil under the working conditions one quarter of a second to travel the distance transversely through by the ring; it would take at least three times as long to travel the distance in back of the ring over the three surfaces, under the same working pressures. Thus the fact that the oil flows by in this manner does not affect its efficiency so as to make it loose power, but has other effects that makes it beneficial. The time element in the speed of the piston prevents effective oil leakage. The pressure is usually sufficient to induce a scouring action along the back surfaces of the grooves. The oil forced through by the travel of the piston cleans out the grooves and keeps the metal cold. The ring is also cooled and kept lubricated by the flow of lubricant so that any movement required in its operation proceeds with the greatest facility, while not permitting leakage of pressure gases. The wear on the piston is reduced by this provision for lubrication, and the action on the cylinder walls improved. The speed of the piston and piston rings is exceeded by the movements of the ring internally in the groove and the improved method of lubrication alleviates the movements. The variable surfaces of the cylinder walls, the varying temperatures about the rings; and the different pressures, loads, and directions of travel, bring about a considerable variation in the actions and stresses on the piston rings and the distortions induced by each, have to be properly compensated for. Other forms of piston rings do not provide for these effects and stresses, and while a form of piston ring might appear to approach its shape, such form is but incidental or accidental, and not as an inventive appreciation of the facts and functions brought out in this specification of the invention.

Thus, the use of a non-cast-iron wire ring or bar of certain standard and circular cross-section may be used sometimes, because such are commercially available. However, such use would be to cheapen the cost of manufacture, and would not result in suitable piston rings, because cast iron has been found to be, for all practical purposes, the most suitable at the present time. Empirically, it has been found that the new type of ring herein mentioned enables the piston to operate more efficiently as well as avoid the many troubles incurred by the carbonizing of the oils in the conventional corners of the grooves, and the lack of proper circulation of the lubricant about the rings. The quasi-capillary action of the corners of the conventional grooves is avoided, while in this case, the tension of the oil covering the surfaces of the grooves and inner surfaces of the rings serves to encourage the flow of oil across them, and seal them against pressure leakage. In flowing through, the heat is taken from the rings and piston and keeps them closer to the most desirable temperature.

In the modified form (Figure 4) the upper and lower face planes 12 and 13 respectively of the ring 3 are cut back on a slightly converging angle, as indicated, to promote a freer movement of the lubricant into the groove and out of it, as well as afford a less abrasive action on the surface of the cylinder wall. The straight upper and lower surfaces 25 and 26 respectively indicated are provided for all the grooves. The internal peripheral surface of the ring has circular corners 27 of small radius curvature, with a middle and intervening curve 28 joining them. The radius of the latter being about equal to three-quarters of the thickness of the ring. The surfaces of the piston ring and groove have more contact area than that of flat surfaces of similar thickness length and thus provide more cooling space. The flow of oil is unobstructed by eddy currents and proceeds with facility and smoothness in the direction opposite to that of the stroke, and thus offsets any tendency of the pressure gases to leak past; especially in internal combustion engines. In other types of engines, the action would be more effective. The form shown in Figure 3, indicates a cylinder 8 with a stationary packing ring 23 similarly constructed to the rings in the piston aforesaid, so as to produce a similar result in a reverse construction.

While but one general outline of the invention is shown in the drawing, it is not desired to limit this application to the particular form indicated, otherwise than limited by the prior art, as it is appreciated that other constructions could be made that would employ the same principles and come within the scope of the appended claims.

Having thus described the invention, what is claimed is:

1. The combination of a piston groove of the class described adapted to receive a piston ring and having its inner or peripheral bottom portion curved and its upper and lower transverse sides flat and at right angles to the axis of the piston, and a piston ring mounted in the groove with its rear portion curved on a flatter curve than that of adjacent bottom portion to provide gradually increasing spacing towards the middle of the surface of the groove and rear surface of the ring and with its upper and lower face surfaces flat and converging slightly from its piston wall engaging side where the ring projects from the groove to provide openings and passages into the groove for the unbroken flow of lubricant therethrough in back of the ring and in front of the groove surfaces.

2. The combination of a piston groove of the class described adapted to receive and hold a piston ring and having its circumferential bottom portion rounded arcuately and concavedly with its upper and lower transverse surfaces parallel and flat and radially disposed with respect to the axis of the piston, and a piston ring disposed in the groove with its inner peripheral surface adjacent the said bottom portion, said peripheral surface being rounded on a flatter arc than that of the bottom portion of the groove to provide an increasing spacing between the middle of the peripheral surface and bottom portion aforesaid, the corners of the ring being rounded within the groove to facilitate the entrance to and exit from this spacing, the upper and lower surfaces of the ring being converged outwardly from the said peripheral portion to the mouth of the groove to provide an appreciable opening to and from the groove, to promote the continuous flow of lubricant from the piston walls between the internal surfaces of groove and piston ring substantially as described.

JAY TREXLER.